US012686286B2

(12) United States Patent
Chon

(10) Patent No.: US 12,686,286 B2
(45) Date of Patent: Jul. 21, 2026

(54) POWER MANAGEMENT DEVICE AND VEHICLE HAVING THE SAME

(71) Applicants: HYUNDAI MOTOR COMPANY, Seoul (KR); KIA CORPORATION, Seoul (KR)

(72) Inventor: Un Chon, Seongnam-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 895 days.

(21) Appl. No.: 18/077,503

(22) Filed: Dec. 8, 2022

(65) Prior Publication Data

US 2023/0339344 A1      Oct. 26, 2023

(30) Foreign Application Priority Data

Apr. 25, 2022    (KR) ........................ 10-2022-0050913

(51) Int. Cl.
| | |
|---|---|
| *H02J 7/00* | (2026.01) |
| *B60L 53/22* | (2019.01) |
| *B60L 53/68* | (2019.01) |
| *B60W 50/10* | (2012.01) |
| *H02J 7/14* | (2006.01) |
| *B60L 53/53* | (2019.01) |

(52) U.S. Cl.
CPC .............. *B60L 53/22* (2019.02); *B60L 53/68* (2019.02); *B60W 50/10* (2013.01); *B60L 53/53* (2019.02)

(58) Field of Classification Search
CPC ......... B60L 53/00; B60L 53/22; B60L 53/53; B60L 53/66; B60L 53/67; B60L 53/68; B60W 50/10

USPC .......................................................... 320/109
See application file for complete search history.

(56) References Cited

U.S. PATENT DOCUMENTS

| | | | | |
|---|---|---|---|---|
| 10,471,836 B2* | 11/2019 | Yabuuchi | .................. | B60L 3/04 |
| 2009/0276640 A1* | 11/2009 | Wu | ........................... | G06F 1/32 |
| | | | | 713/300 |
| 2010/0204859 A1* | 8/2010 | Kamaga | .................. | B60L 53/64 |
| | | | | 701/22 |
| 2013/0257344 A1* | 10/2013 | Millet | ..................... | B60L 50/52 |
| | | | | 307/10.7 |
| 2013/0257375 A1* | 10/2013 | Ang | ........................ | B60L 58/12 |
| | | | | 320/109 |
| 2013/0264867 A1* | 10/2013 | Mitsutani | .................. | B60L 1/00 |
| | | | | 307/10.1 |
| 2014/0088827 A1* | 3/2014 | Yashiro | ................... | B60L 53/14 |
| | | | | 701/36 |
| 2014/0203759 A1* | 7/2014 | Sugiyama | ............... | B60L 58/15 |
| | | | | 320/104 |
| 2014/0343831 A1* | 11/2014 | Hosey | .................. | H02J 7/0032 |
| | | | | 324/426 |

(Continued)

*Primary Examiner* — Alexis B Pacheco
(74) *Attorney, Agent, or Firm* — Morgan, Lewis & Bockius LLP

(57) ABSTRACT

A vehicle controls the distributor to cut off the power supplied to the drive motor in a standby mode and control the standby mode to be switched to an OFF mode when a preset time elapses from a start time point of the standby mode. The vehicle extends a time for which the standby mode is performed or controls power to be immediately turned off when power extension time information or an immediate off request signal is received by the processor through the input device before switching to the OFF mode while the standby mode is performed.

19 Claims, 8 Drawing Sheets

(56) References Cited

U.S. PATENT DOCUMENTS

| | | | |
|---|---|---|---|
| 2014/0371969 A1* | 12/2014 | Asai | B60L 58/40 |
| | | | 701/22 |
| 2016/0250928 A1* | 9/2016 | Matsuda | B60L 53/53 |
| | | | 701/22 |
| 2017/0174157 A1* | 6/2017 | Deljevic | B60L 58/12 |
| 2017/0259690 A1* | 9/2017 | Koga | B60L 58/13 |
| 2018/0001774 A1* | 1/2018 | Murata | B60L 53/50 |
| 2019/0139162 A1* | 5/2019 | Sawada | B60L 53/60 |
| 2020/0016990 A1* | 1/2020 | Esdel | B60L 58/18 |
| 2022/0388419 A1* | 12/2022 | Doi | B60L 53/16 |
| 2022/0396175 A1* | 12/2022 | Kim | H01M 10/425 |
| 2023/0055841 A1* | 2/2023 | Mori | G06Q 50/06 |
| 2023/0406152 A1* | 12/2023 | Ko | B60L 53/68 |
| 2024/0005418 A1* | 1/2024 | Paik | G06Q 50/10 |

* cited by examiner

"PLEASE ENTER POWER EXTENSION TIME"

15:00

| SET | CANCEL |

POWER MANAGEMENT DEVICE AND VEHICLE HAVING THE SAME

CROSS-REFERENCE TO RELATED APPLICATION

The present application claims priority to Korean Patent Application No. 10-2022-0050913, filed on Apr. 25, 2022, the entire contents of which is incorporated herein for all purposes by this reference.

BACKGROUND OF THE PRESENT DISCLOSURE

Field of the Present Disclosure

The present disclosure relates to a power management device configured to control the supply of power charged in first and second batteries in a stopped state, and a vehicle having the same.

Description of Related Art

A vehicle is a machine configured to move on a road by driving wheels and requires power to move. Vehicles may be classified into internal combustion engine vehicles and eco-friendly vehicles according to a power source.

Here, the eco-friendly vehicles include electric vehicles including batteries which are chargeable power suppliers and a drive motor and configured to rotate the drive motor with electricity accumulated in the batteries and drive the wheels using the rotation of the drive motor and hybrid electric vehicles including an engine, batteries, and a drive motor and configured to travel by controlling mechanical power of the engine and electric power of the drive motor.

The eco-friendly vehicle includes a first battery configured to supply power for starting and traveling power, further includes various electrical components configured to protect passengers and provide convenience and fun to the passengers, and further includes a second battery configured to supply power for driving to various electronic components (i.e., electronic devices).

Although the conventional eco-friendly vehicle may supply the power of the first battery to various electronic components in a stopped state, only the power of the second battery is supplied to various electronic components. Therefore, there has been a problem in that it cannot efficiently use the power of batteries in the eco-friendly vehicle.

Furthermore, the conventional eco-friendly vehicle may supply the power of the first battery to various electronic components in a stopped state only when a power device and a transmission device are shut off. Therefore, conventionally, there has been inconvenience in using the power of the first battery in the eco-friendly vehicle.

Furthermore, the electric vehicle among the conventional eco-friendly vehicles needs to turn on to activate power of all drive systems to use the power of the first battery in the stopped state.

As described above, because an electronic transmission device may be operated at any time when it is necessary to activate the power of all drive systems to supply power to convenience devices (e.g., for "camping, car theater, laptop, entertainment, game, leisure") operating in a situation in which motor control is unnecessary in the stopped state, there has been an undesirable problem from the viewpoint of the passenger's safety.

Therefore, techniques of supplying the power of the first battery to extend the use time of a passenger's convenience device in the stopped state and cutting off the power supply to loads of the drive systems are being required.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a power management device configured to perform a standby mode when an ON signal of a start button is received in a stopped state and supply power of a first battery to various electronic components and a vehicle having the same.

It is another aspect of the present disclosure to provide a power management device configured to cut off power supply of a first battery after a preset time elapses from a start time point of a standby mode in a state in which a user has boarded a vehicle in the standby mode, display a remaining time which can supply power of the first battery in a state in which the user has exited in the standby mode, and display windows which can change the remaining time and the vehicle having the same.

Additional aspects of the present disclosure will be set forth in part in the description which follows, and in part, will be obvious from the description, or may be learned by practice of the present disclosure.

In accordance with one aspect of the present disclosure, a power management device includes an input device, a first battery, a converter connected to the first battery and configured to convert power charged in the first battery into power including a different magnitude, a second battery electrically connected to the converter and configured to perform charging using the power transmitted from the converter, a distributor configured to distribute power of the first and second batteries and the converter, and a processor connected to the input device and the distributor and configured to perform control to be switched to an OFF mode when a preset time elapses from a start time point of a standby mode, and to perform control so that a time in the standby mode is extended when power extension time information is received through the input device before switching to the OFF mode.

The power management device according to one aspect may further include a display and a communicator. The processor of the power management device according to one aspect may control the display to display an image of an OFF timer and an image of a button for changing setting information of the standby mode when the processor receives a user's absence signal through the communicator.

The image of the button of the power management device according to one aspect may include an image of a power extension time button, an image of a standby mode maintenance button, and an image of an immediate power OFF button.

The distributor of the power management device according to one aspect may include a first switch connected between the first battery and a drive motor, a second switch connected between the first battery and a first load, a third switch connected between the converter and a second load, and a fourth switch connected between the second battery and a third load.

The processor of the power management device according to one aspect may control an OFF operation of the first switch, control ON operations of the second, third and fourth switches in the standby mode, and control OFF operations of the first, second, third and fourth switches in the OFF mode.

The power management device according to one aspect may further include a communicator. The processor of the power management device according to one aspect may switch the OFF mode to a ready mode when a start ON signal and a pedal signal of a brake pedal are received through the communicator while performing the OFF mode and switch the ready mode to the OFF mode when a start OFF signal and the pedal signal of the brake pedal are received through the communicator while performing the ready mode.

The power management device according to one aspect may further include a communicator. The processor of the power management device according to one aspect may switch the OFF mode to the standby mode when the processor receives a parking stage signal of a shift lever and a start ON signal through the communicator while performing the OFF mode and switch the standby mode to the OFF mode when the processor receives a start OFF signal through the communicator while performing the standby mode.

The power management device according to one aspect may further include a communicator. The processor of the power management device according to one aspect may switch the standby mode to a ready mode when the processor receives a release signal of a parking button and a pedal input signal of a brake pedal for shift through the communicator while performing the standby mode and switch the ready mode to the standby mode when the processor receives a parking stage signal of a shift lever through the communicator while performing the ready mode.

The processor of the power management device according to one aspect may control an operation of an ON timer when the parking stage signal of the shift lever is not received by the processor through the communicator while performing the ready mode and switch the ready mode to the standby mode when it is determined that there is no traveling intention while the ON timer operates after a reference time elapses.

In accordance with another aspect of the present disclosure, an input device, a display, a first battery, a drive motor connected to a wheel of the vehicle and driven using power of the first battery, a converter connected to the first battery and configured to convert the power charged in the first battery into power including a magnitude different from a magnitude of the power of the first battery, a second battery electrically connected to the converter and configured to perform charging using the power transmitted from the converter, a distributor configured to distribute power of the first and second batteries and the converter, and a processor connected to the distributor and configured to control the distributor to cut off the power supplied to the drive motor in a standby mode and control the standby mode to be switched to an OFF mode when a preset time elapses from a start time point of the standby mode. The processor extends a time for which the standby mode is performed or controls power to be immediately turned off when power extension time information or an immediate off request signal is received by the processor through the input device before switching to the OFF mode while the standby mode is performed.

The vehicle of the vehicle according to another aspect may further include a detector configured to detect states in which a user boards and exits. The processor of the vehicle according to another aspect may determine whether the user has exited the vehicle based on detection information of the detector and control the display operatively connected to the processor to change an image displayed on the display to an image indicating that the standby mode is active and to display the changed image when the processor concludes that the user has exited the vehicle. The image indicating that the standby mode is active may include an image of an OFF timer which counts a remaining time until a time point when the standby mode is switched to the OFF mode and an image of a button for changing setting information of the standby mode.

The processor of the vehicle according to another aspect may determine whether the user has boarded the vehicle based on the detection information of the detector and control the standby mode to be maintained when the processor concludes that the user has boarded the vehicle.

The distributor of the vehicle according to another aspect may include a first switch connected between the first battery and the drive motor, a second switch connected between the first battery and a first load, a third switch connected between the converter and a second load, and a fourth switch connected between the second battery and a third load. The processor of the vehicle according to another aspect may control an OFF operation of the first switch and ON operations of the second, third and fourth switches in the standby mode, and control OFF operations of the first, second, third and fourth switches in the OFF mode.

The vehicle according to another aspect may further include a start button and a pedal signal receiver configured to receive a pedal signal of a brake pedal. The processor of the vehicle may switch the OFF mode to a ready mode when the processor receives a start ON signal through the start button and the pedal signal through the pedal signal receiver while performing the OFF mode and switch the ready mode to the OFF mode when the processor receives a start OFF signal through the start button and the pedal signal through the pedal signal receiver while performing the ready mode.

The vehicle according to another aspect may further include a start button and a lever signal receiver configured to receive a signal of a shift lever. The processor of the vehicle may switch the OFF mode to the standby mode when the processor receives a parking stage signal of the shift lever through the lever signal receiver and a start ON signal of the start button while performing the OFF mode and switch the standby mode to the OFF mode when the processor receives a start OFF signal of the start button while performing the standby mode.

The vehicle according to another aspect may further include a parking button, a pedal signal receiver configured to receive a pedal signal of a brake pedal of the vehicle, and a lever signal receiver configured to receive a signal of a shift lever. The processor of the vehicle may switch the standby mode to a ready mode when a release signal of a parking button and the pedal signal are received while performing the standby mode and switch the ready mode to the standby mode when the processor receives a parking stage signal of the shift lever through the lever signal receiver while performing the ready mode.

The processor of the vehicle according to another aspect may control an operation of an ON timer when entering the ready mode and switch the ready mode to the standby mode when a time counted by the ON timer elapses a reference time.

The vehicle according to another aspect may further include a pedal signal receiver configured to receive a pedal signal of a brake pedal. The processor of the vehicle may stop a remaining time count until a switching time point to the OFF mode when the processor receives the pedal signal before switching the standby mode to the OFF mode while performing the standby mode.

The vehicle according to another aspect may further include a detector configured to detect states in which a user boards and exits. The processor of the vehicle may determine whether the user has exited the vehicle based on detection information of the detector and change the display to a power saving mode when the processor concludes that the user has exited the vehicle.

The processor of the vehicle according to another aspect may control the display to display an image of a call button when it is determined that the user has exited the vehicle and transmit call information to the user whose contact information is pre-registered when the processor concludes that the call button is selected through the input device.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 5 is an exemplary view showing a display of a vehicle terminal provided in a vehicle according to an exemplary embodiment of the present disclosure;

Figure 1:
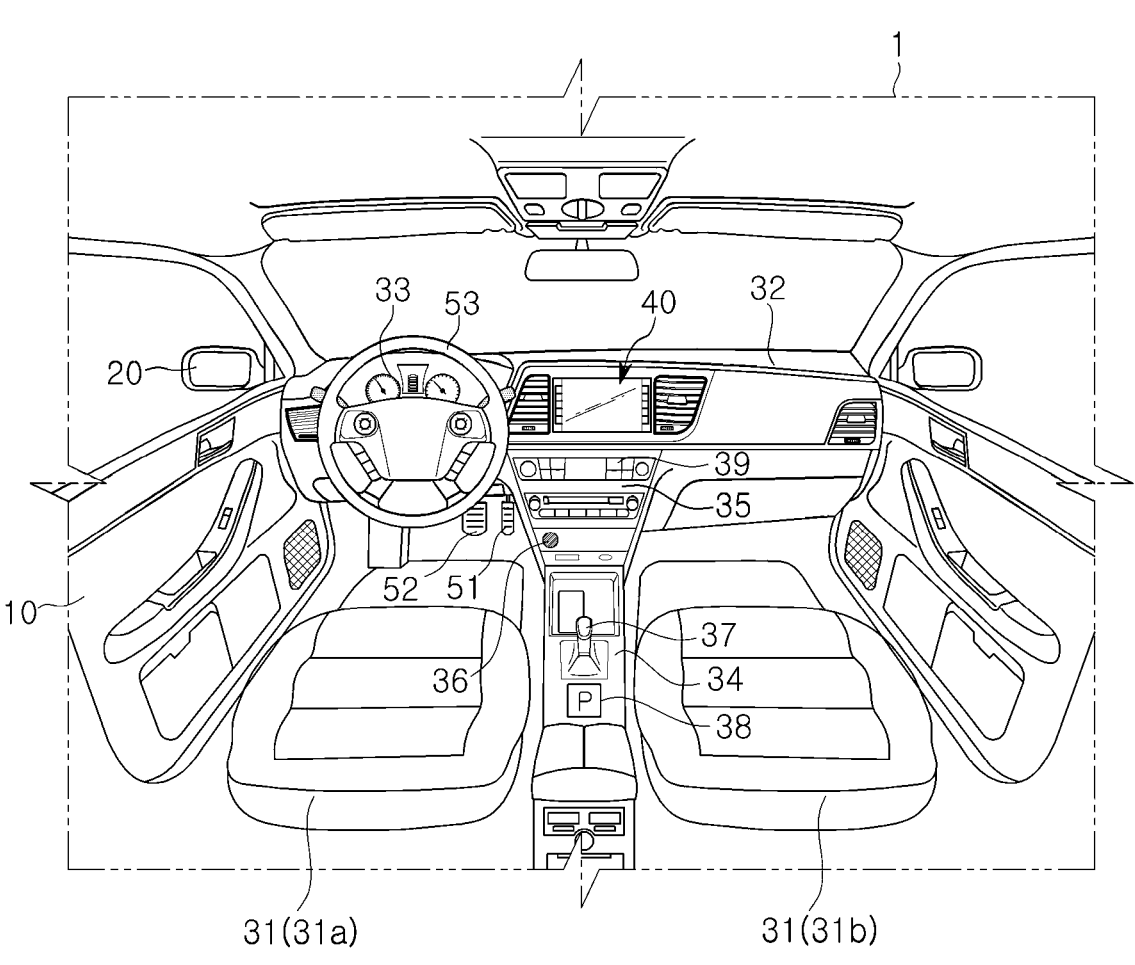
FIG. 1 is an exemplary view showing an interior of a vehicle body according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The same reference numerals refer to the same components throughout the specification. The specification does not describe all elements of the embodiments, and general contents in the art to which the present disclosure pertains or overlapping contents among the exemplary embodiments will be omitted. Terms "unit, module, member, and block" used in the specification may be implemented in software or hardware, and according to the embodiments, a plurality of "units, modules, members, and blocks" may be implemented as one component or one "unit, module, member, and block" may also include a plurality of components.

Throughout the specification, when a certain portion is referred to as being "connected" to another portion, it includes not only a case in which the certain portion is directly connected to another portion but also a case in which it is indirectly connected thereto, and the indirect connection includes a connection through a wireless communication network.

In addition, when a certain portion is referred to as "including" a certain component, it means that other components may be further included, rather than excluding the other components unless otherwise stated.

Throughout the specification, when a certain member is referred to as being positioned "on" another member, this includes not only a case in which the certain member comes into contact with another member but also a case in which other members are present between the two members.

Terms such as first and second are used to distinguish one component from another, and the components are not limited by the above-described terms.

The singular expression includes the plural expression unless the context clearly dictates otherwise.

In each operation, identification signs are used for convenience of description, and the identification signs do not describe the order of each operation, and each operation may be performed differently from the specified order unless the context clearly states the specific order.

Hereinafter, an operating principle and embodiments of the present disclosure will be described with reference to the accompanying drawings.

Figure 2:
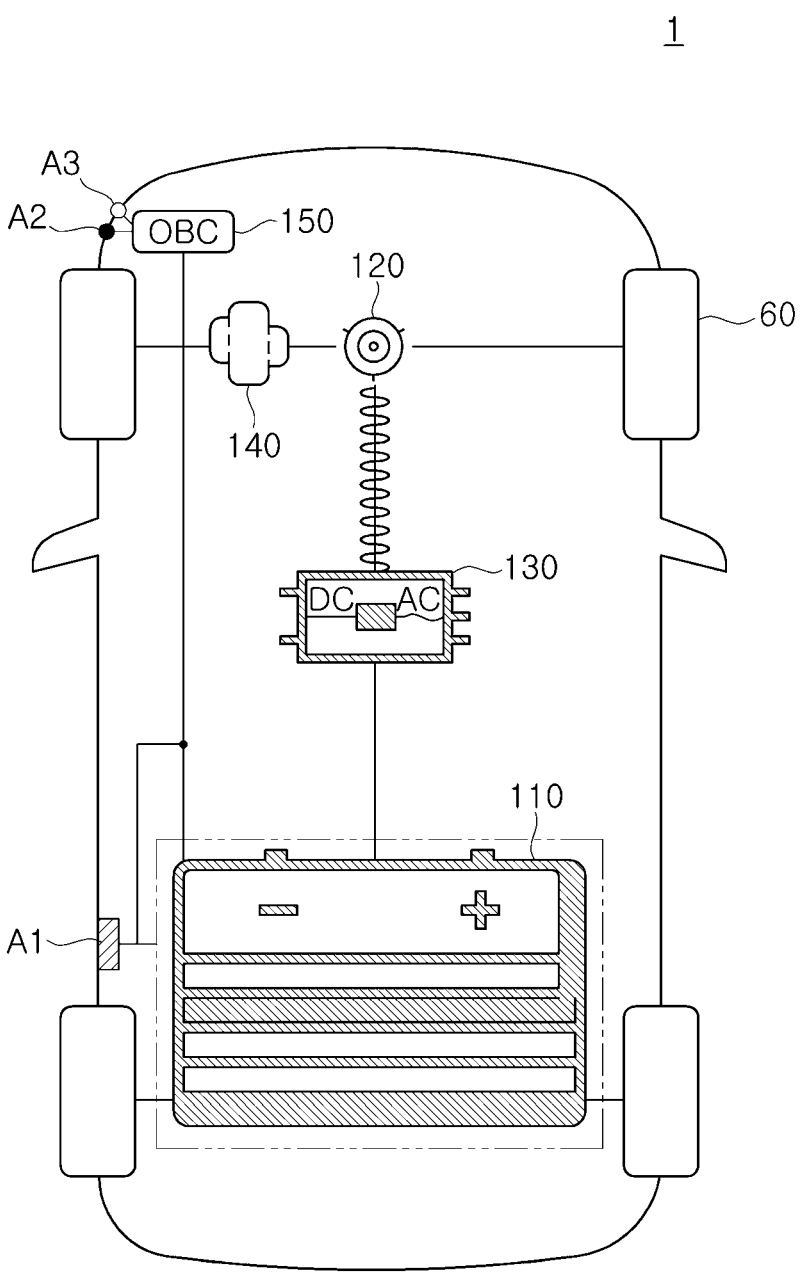
FIG. 2 is an exemplary view showing a power device of a vehicle according to an exemplary embodiment of the present disclosure.

FIG. 1 is an exemplary view showing an interior of a vehicle body according to an exemplary embodiment of the present disclosure, and FIG. 2 is an exemplary view showing a power device of the vehicle according to the embodiment.

The vehicle according to the exemplary embodiment of the present disclosure may be an eco-friendly vehicle which travels using electricity as power to decrease fuel cost and harmful gas emission of the vehicle.

The eco-friendly vehicle includes an electric vehicle including a battery which is a rechargeable power supplier and a drive motor and configured to rotate the drive motor with electricity accumulated in the battery and drive wheels using the rotation of the drive motor, a hybrid electric vehicle including an engine, a battery, and a drive motor and configured to travel by controlling mechanical power of the engine and electric power of the drive motor, and a hydrogen fuel cell vehicle.

In the exemplary embodiment of the present disclosure, the electric vehicle will be referred to as an example.

A vehicle 1 includes a body including an exterior and an interior and a chassis configured to support the body and on which mechanical devices required for traveling are provided as the remaining portions except for the body.

The exterior of the body includes a front panel, a bonnet, a roof panel, a rear panel, front left/right and rear left/right doors 10, and window glasses provided on the front left/right and rear left/right doors 10 to be opened and closed.

The exterior of the body includes a side mirror 20 configured to provide a driver with a rear view of the vehicle 1 and a lamp configured to allow the driver to easily see surrounding information while keeping an eye on a front view and perform a function of a signal for and communication with other vehicles and pedestrians.

As shown in FIG. 1, the interior of the body includes seats 31 (31a and 31b) on which riders sit, a dashboard 32, a cluster 33 arranged on the dashboard 32 and on which a tachometer, a speedometer, a coolant thermometer, a fuel gauge, a turn indicator light, a high beam indicator, a warning light, a seat belt warning light, an odometer, a shift lever indicator light, a door open warning light, an engine oil warning light, a low fuel warning light, and the like are arranged, a center fascia 34 on which a ventilator and a control plate of an air conditioner are provided, a head unit 35 provided on the center fascia and configured to receive operation commands of an audio device and the air conditioner, and a start button 36 (or referred to as a booting button) configured to receive a start command.

The seat may include a driver's seat 31a on which the user sits, a passenger seat 31b on which a fellow passenger sits, and a rear seat on which the fellow passenger sits.

The cluster 33 may include a display panel and display information on first and second batteries and information on a power mode in response to a control command from a power management device 200.

The vehicle 1 includes a shift lever 37 provided on the center fascia 34 and configured to receive an operation position and a parking button (EPB button) 38 positioned around the shift lever 37 or on a head unit 35 and configured to receive an operation command of an electronic parking brake device.

The vehicle 1 further includes an audio/video/navigation (AVN) device 40 (or referred to as a vehicle terminal) for user convenience. The AVN device 40 may be provided on the dashboard in a buried or mounted type.

The vehicle includes an accelerator pedal 51 pressed by the user according to the user's acceleration intention, a brake pedal 52 pressed by the user according to the user's braking will, and a steering wheel 53 of a steering device configured to adjust a traveling direction thereof.

The chassis may be provided with wheels 60 arranged on each of the front, rear, left and right sides, a power device 100 configured to apply a driving force to the front, rear, left and right wheels 60, the steering device, and a braking device configured to apply a braking force to the front, rear, left and right wheels 60, and a suspension device.

The power device 100 is a device configured to generate a driving force required for traveling the vehicle and adjusts the generated driving force.

As shown in FIG. 2, the power device 100 of the vehicle 1 includes a first battery 110, a drive motor 120, an inverter 130, a reducer 140, and an on board charger (OBC) 150.

The first battery 110 may include a plurality of battery cells configured to supply a driving force to the vehicle by generating a high-voltage current.

The first battery 110 may include a plurality of battery modules. Furthermore, each battery module may include the plurality of battery cells connected in series and in parallel.

The battery cells may be collected to form the battery module, and the battery modules may be collected to form a battery pack.

The drive motor 120 generates a rotation force using electrical energy of the first battery 110 and transmits the generated rotation force to the wheel 60 to drive the wheel 60.

The drive motor 120 converts the electrical energy of the first battery 110 into mechanical energy for operating various devices provided in the vehicle.

When the start button 36 is turned on, the drive motor 120 generates a maximum torque by receiving a maximum current.

The drive motor 120 may also operate as a generator under energy regeneration conditions by braking, deceleration, downhill road traveling, or low-speed traveling to charge the first battery 110.

The inverter 130 drives the drive motor 120 in response to a control command of a processor. The inverter 130 may convert power of the first battery 110 into driving power of the drive motor 120.

When the driving power of the drive motor 120 is output, the inverter 130 outputs the driving power of the drive motor 120 based on a target traveling speed according to a user command. Here, the driving power of the drive motor 120 may vary in accordance with a switching signal for outputting a current corresponding to the target traveling speed and a switching signal for outputting a voltage corresponding to the target traveling speed.

The inverter 130 may transmit power generated from the drive motor 120 to the first battery 110 upon regenerative braking. In other words, the inverter 130 includes a plurality of switch elements, and may also perform a function of changing a direction and output of the current between the drive motor 120 and the first battery 110.

The reducer 140 decreases a speed of the drive motor 120 and transmits the rotation force increased from the torque of the drive motor 120 to the wheel 60.

The vehicle may further include the OBC 150 provided on the exterior of the body, to which a fast charging cable or a slow charging cable is connected and configured to receive power for charging the first battery 110.

The OBC 150 may include a fast charger A1 configured to rapidly charge the first battery 110 and a slow charger A2 configured to charge the first battery 110 at a slow speed which is slower than that of the fast charger.

The fast charging cable for fast charging may be connected to the fast charger A1, and the slow charging cable for slow charging may be connected to the slow charger A2.

Furthermore, the fast charger A1 for fast charging and the slow charger A2 for slow charging, which has a slower charging speed than that of the fast charger, may also be provided at a same position of the exterior of the vehicle or may also be provided at different positions thereof.

The fast charger A1 and the slow charger A2 may be outlets to which the fast charging cable and the slow charging cable for charging are connected.

The fast charger A1 may allow the first battery 110 of the vehicle to be directly connected to an external power source connected to the fast charging cable. Here, the external power source may supply power of about 220 V to the vehicle as power from a charging station or a power grid.

Furthermore, a conversion device including a converter, an inverter, a high frequency isolation transformer, a rectifier, and the like may be provided in the fast charging cable. The conversion device in the fast charging cable may convert commercial alternating current (AC) power into power for fast charging of the battery of the vehicle.

Furthermore, the power source may include a fast power source and a slow power source.

The fast power source may supply power of about 800 V to the vehicle through the fast charging cable. In the instant case, the fast cable may be used as a means for supplying the power of 800 V.

The slow power source may supply the power of 220 V to the vehicle.

The slow charger A2 may be an outlet into which a 5-pin connector is inserted and connected or an outlet into which a 7-pin connector is inserted and connected.

When the cable is the 5-pin connector, the cable may include a live pin (L1), a neutral pin (L2/N), a ground (GND) pin, a proximity detection (PD) pin, and a control pilot (CP) pin which is a control confirmation pin.

When the cable has 7 pins, the cable may further include L2 and L3 pins as a 3-phase AC connector.

The OBC 150 converts the external commercial power (AC power) supplied from the slow charger A2 into rectified power and DC power and transmits the rectified power and DC power to the first battery 110. The OBC 150 may include an AC rectifier, a power factor correction (PFC) device, a converter, and a capacitor.

The OBC 150 may further include a power transmitter A3 to which a power transmission cable is connected.

The vehicle 1 may include various electronic components for controlling the vehicle 1 and for the passenger's safety and convenience as well as the mechanical components described above.

For example, the electric components may include the audio/video/navigation (AVN) device 40 (or a vehicle terminal) configured to provide various information and entertainment to the driver through sounds and images, a heating/ventilation/air conditioning (HVAC) device configured to control the introduction of outside air into the vehicle 1 or heat or cool inside air according to a temperature inside the vehicle 1, a door lock device, a wiper, a power seat, a heating wire of the seat, a ventilation device for seat, an indoor lamp, and a power tail gate.

Various electronic components may be loads configured to perform a predetermined function while receiving power and consuming the received power.

The electronic components may communicate with each other through a vehicle communication network (NT). For example, the electronic components may exchange data through an Ethernet, a media oriented systems transport (MOST), a Flexray, a controller area network (CAN), a local interconnect network (LIN), and the like.

Figure 3:
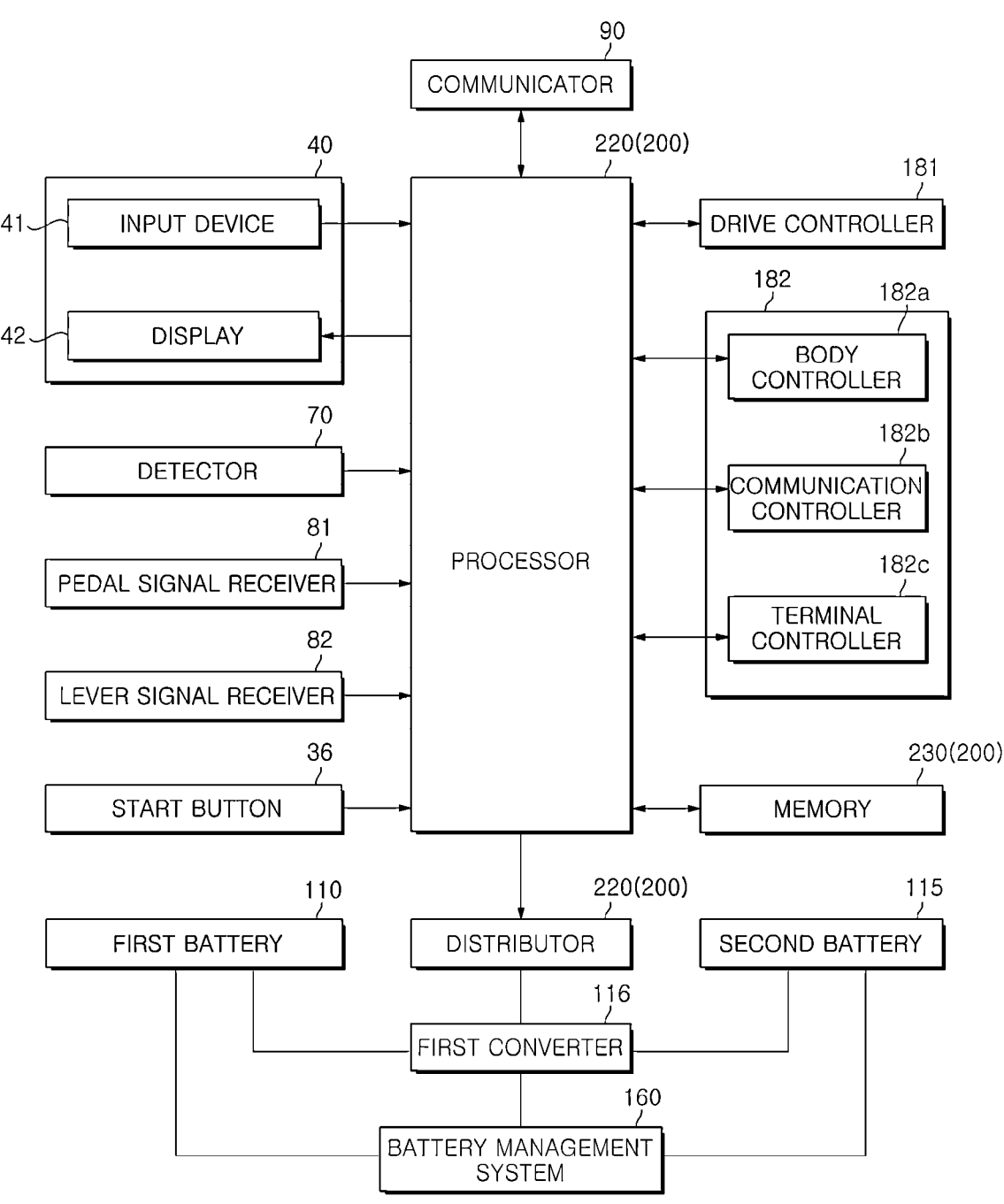
FIG. 3 is a control schematic diagram of a vehicle according to an exemplary embodiment of the present disclosure.
Figure 4:
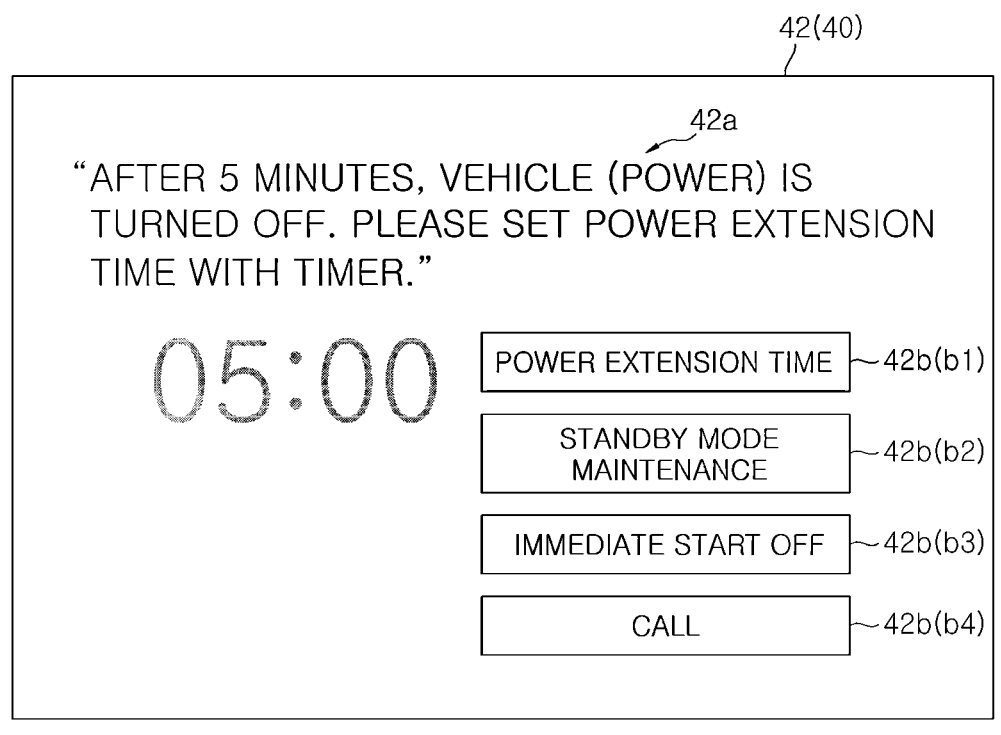
FIG. 4 is an exemplary view showing a display of a vehicle terminal provided in a vehicle according to an exemplary embodiment of the present disclosure.
Figure 5:
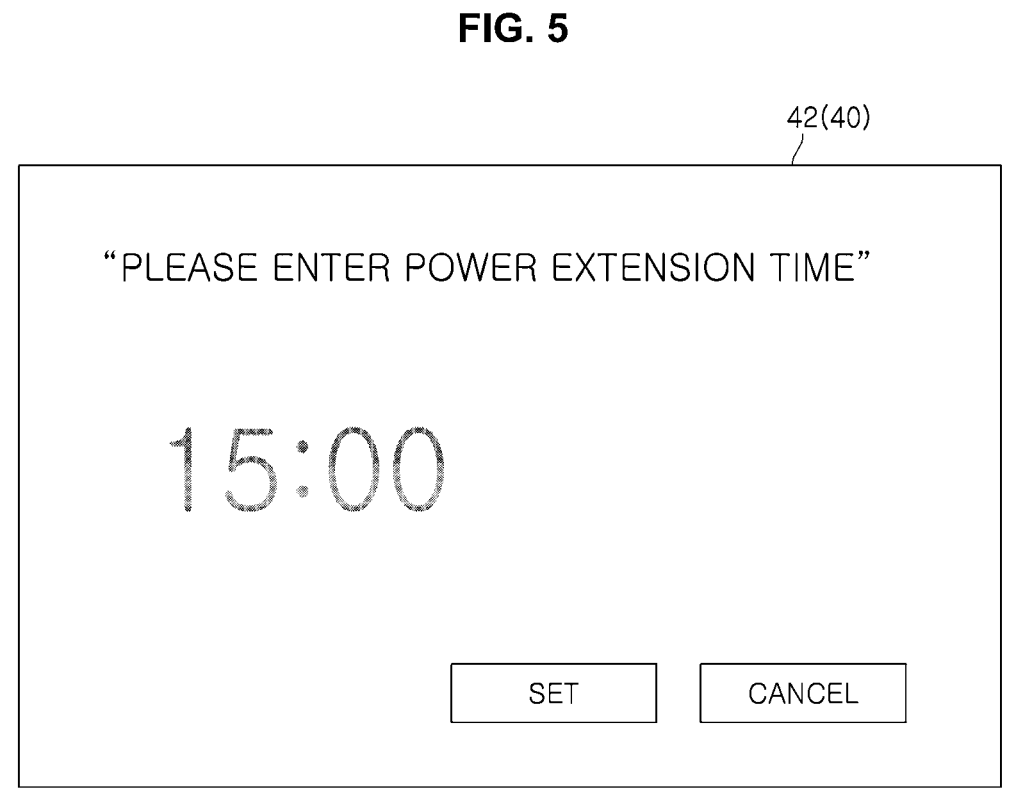
Figure 6:
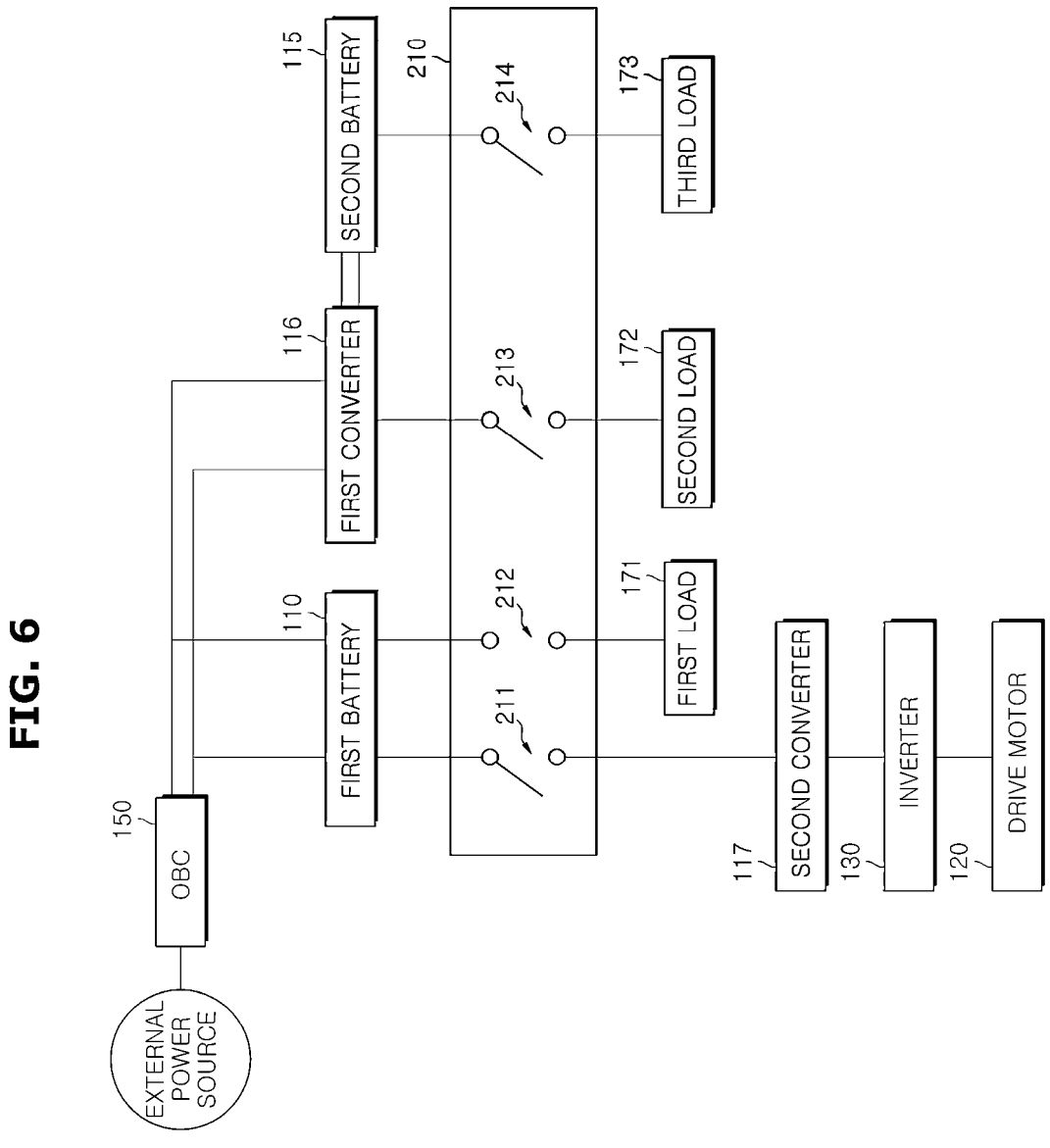
FIG. 6 is a schematic diagram of a power system managed by a power management device of a vehicle according to an exemplary embodiment of the present disclosure.

FIG. 3 is a control schematic diagram of a vehicle according to an exemplary embodiment of the present disclosure, FIG. 4 is an exemplary view showing a display of a vehicle terminal provided in a vehicle according to an exemplary embodiment of the present disclosure, FIG. 5 is an exemplary view showing a display of a vehicle terminal provided in a vehicle according to an exemplary embodiment of the present disclosure, and FIG. 6 is a schematic diagram of a power system managed by a power management device of a vehicle according to an exemplary embodiment of the present disclosure.

As shown in FIG. 3, the vehicle 1 includes the start button 36, the vehicle terminal 40, a detector 70, a pedal signal receiver 81, a lever signal receiver 82, a communicator 90, the first battery 110, a second battery 115, a first converter 116, a battery management system (BMS) 160, a plurality of controllers 181 and 182, and the power management device 200.

The start button 36 may be operated by the user. The start button 36 may receive start ON/OFF commands as a user input and transmit a start ON signal corresponding to the received start ON command and a start OFF signal corresponding to the start OFF command to the power management device 200.

The vehicle terminal 40 (the AVN device) displays information on a function being operated in the vehicle 1 or a function operable in the vehicle and also displays information input by the user.

For example, the vehicle terminal 40 may perform at least one of a navigation function, a broadcasting function, an audio function, a video function, a phone call function, a radio function, and an Internet function.

The vehicle terminal 40 may perform at least one function selected by the user, display operation information of the function being performed, and the like, and also display an image obtained by a camera of the vehicle.

The vehicle terminal 40 may display a user input for the power mode and information on the power mode.

The vehicle terminal 40 may include a display 42 and further include an input device 41.

When the display 42 and the input device 41 are provided in the vehicle terminal 40, the vehicle terminal 40 may be a touch screen in which the input device 41 and the display 42 are integrally provided.

When only the display 42 is provided in the vehicle terminal 40, the input device for a display command of the display 42 may be provided on the head unit or the center fascia of the vehicle 1.

In the instant case, the input device may be provided as at least one of a button, a switch, a key, a touch panel, a jog dial, a pedal, a keyboard, a mouse, a track-ball, various levers, a handle, and a stick.

In the exemplary embodiment of the present disclosure, the vehicle terminal 40 in which the input device 41 and the display 42 are integrally provided will be described.

The input device 41 of the vehicle terminal 40 may receive the user input.

The input device 41 may receive a function or identification information of the electronic device to be operated in a parked state and a stopped state.

The input device 41 may receive a selection signal of at least one of a power extension time button, a standby mode maintenance button, an immediate power OFF button, and a call button.

The input device 41 may receive a power extension time for extending power supply through the first battery.

The input device 41 may receive contact information of the driver (i.e., the user).

The display 42 may display information received through the input device 41.

The display 42 may display the currently performed power mode.

The power mode may include an off mode, a standby mode, a ready mode, and an emergency mode.

The off mode is a mode in which the power supply of the first battery is cut off and a dark current is applied to a predetermined electronic component through the second battery.

The standby mode is a mode in which power supply to the drive motor is cut off and power is supplied to first, second, and third loads.

The ready mode is a mode in which power is supplied to the drive motor and the first, second, and third loads.

The emergency mode is a mode in which power is supplied to the drive motor in a state in which the power supply to at least one of the first, second, and third loads is not smoothly performed in a traveling state.

As shown in FIG. 4, the display 42 may display guide information 42a for the standby mode and the remaining time until the standby mode is switched to the off mode.

The display 42 may display a plurality of buttons 42b which may be selected by the user.

In the standby mode, the display 42 may further display a power extension time button b1 which may change the remaining time, a standby mode maintenance button b2 configured to maintain the standby mode, an immediate power OFF button b3 configured to immediately switch the standby mode to the off mode, and a call button b4 configured to call the user.

The power extension time button b1 may be an OFF timer setting button.

The standby mode maintenance button b2 is to unlimitedly maintain the standby mode and may be an OFF timer release button.

The immediate power OFF button b3 may be a power OFF button.

As shown in FIG. 5, the display 42 may display the received power extension time in response to the selection of the power extension time button b1 and further display a setting button configured to set the time selected by the user to the power extension time and a cancel button configured to cancel the setting of the power extension time. At the instant time, the input device 41 may receive the power extension time for extending the power supply time of the first battery 110.

The vehicle may further include a speaker configured to output sound.

The vehicle may output guide information on the power mode in sound or voice.

The speaker outputs audio data to the sound audible by the user by converting the amplified low-frequency voice signal into an original sound wave and generating a compressional wave in the air to copy the sound wave.

One or two or more speakers may be provided, and may also be provided on the vehicle terminal, and provided in the interior of the vehicle.

The detector 70 detects the passenger of each seat and outputs information on the detected passenger to recognize the presence or absence of the passenger and the number of passengers in the vehicle.

The detector 70 may be provided on each seat and each seat belt of the vehicle.

For example, the detector 70 may include at least one of a weight detector, a pressure detector, a capacitance detector, and a seat belt fastening detector.

The detector 70 may also include a camera provided inside the vehicle.

The detector 70 may be provided on each door, detect an opened state of each door and a closed state of the door, and transmit an open signal corresponding to the opened state and a close signal corresponding to the closed state to the power management device 200.

The power management device 200 may determine whether the passenger has boarded or exited the vehicle in response to the open signal of the door and the close signal of the door.

The pedal signal receiver 81 receives a pedal signal corresponding to the pressing of the brake pedal 52 and transmits the received pedal signal to the power management device 200.

The pedal signal receiver 81 may be connected to a pedal force detector and receive a signal of the pedal force detector.

The pedal force detector may be one of a force sensor configured to detect a force corresponding to the pressing of the brake pedal 52, a load cell configured to detect a load corresponding to the pressing of the brake pedal 52, an angle sensor configured to detect a rotation angle with respect to a rotation axis of the brake pedal corresponding to the pressing of the brake pedal 52, a displacement sensor configured to detect a change in a position of the brake pedal 52 corresponding to the pressing of the brake pedal 52, and a stroke sensor configured to detect a stroke corresponding to the pressing of the brake pedal 52.

The lever signal receiver 82 is connected to the shift lever 37 and receives a lever signal corresponding to an operation position of the shift lever 37. For example, the lever signal receiver 82 may receive a signal of a drive stage, a signal of a reverse stage, a signal of a neutral stage, and a signal of a parking stage.

The vehicle may further include a parking button signal receiver configured to receive an ON signal and an OFF signal of the parking button 38.

The vehicle may further include a speed detector configured to detect the traveling speed. The speed detector may include at least one of a plurality of wheel speed sensors and acceleration sensors.

The communicator 90 may include one or more components which enable the communication among an external device and the components inside the vehicle, and include, for example, at least one of a short-range communication module, a wired communication module, and a wireless communication module.

Here, the external device may include a server configured to provide an app for a vehicle manufacturer, a vehicle maintenance center, or vehicle maintenance, include a remote controller, and include the user terminal.

The short-range communication module may include any short-range communication module configured to transmit and receive a signal using a wireless communication network in a short range, such as a Bluetooth module, an infrared communication module, a radio frequency identification (RFID) communication module, a wireless local access network (WLAN) communication module, a near field communication (NFC) module, and a ZigBee communication module.

The wired communication module may include not only any wired communication module, such as a CAN communication module, a local area network (LAN) module, a wide area network (WAN) module, and a value added network (VAN) module, but also a universal serial bus (USB), a high definition multimedia interface (HDMI), a digital visual interface (DVI), a recommended standard232 (RS-232), power line communication, or a plain old telephone service (POTS).

The wired communication module may further include a local interconnect network (LIN).

In addition to the Wi-Fi module and the wireless broadband module, the wireless communication module may include a wireless communication module configured to support any wireless communication method, such as a global system for mobile communication (GSM), a code division multiple access (CDMA), a wideband code division multiple access (WCDMA), a universal mobile telecommunications system (UMTS), a time division multiple access (TDMA), long term evolution (LTE), and an ultra-wideband (UWB) module.

The first battery 110 may be charged and discharged.

The first battery 110 may supply power to a powertrain apparatus including the drive motor 120 and a first load configured to consume high power and supply the power to the second battery.

The first battery 110 may be charged by receiving external power and charged using power generated upon regenerative braking.

The second battery 115 may be charged and discharged.

The second battery 115 may be charged using the power charged in the first battery 110.

The second battery 115 supplies drive power to electronic components such as convenience devices and additional devices. The second battery 115 supplies a current to various electronic components regardless of whether the vehicle is turned on or off.

At the present time, the current supplied to the electronic components when the vehicle is turned off is called a dark current. For example, an electronic component such as a black box or a rear monitoring camera among various electronic components receives the power of the second battery 115 to continuously capture the surroundings even in a parked state after the vehicle is turned off. In other words, the second battery 112 may be continuously discharged after the vehicle is turned off.

The first converter 116 converts DC power of the first battery 110 into DC power suitable for charging the second battery 115 and supplies the converted DC power to the second battery 115 so that the second battery 115 may be charged.

The first converter 116 may include at least one switch element and an inductor.

The first converter 116 may supply power to a second load configured to consume low power.

The BMS 160 may obtain state information on the first and second batteries 110 and 115.

The BMS 160 may include a plurality of sensors configured to collect information on the states of the first and second batteries 110 and 115, such as output voltages of the first and second batteries 110 and 115, input/output currents of the first and second batteries 110 and 115, and temperatures of the first and second batteries 110 and 115.

The plurality of sensors may include a plurality of current sensors configured to detect the currents of the first and second batteries 110 and 115, a plurality of voltage sensors configured to detect voltages at output terminals of the first and second batteries 110 and 115, temperature sensors configured to detect temperatures of the first and second batteries 110 and 115.

Furthermore, the BMS 160 may include a management controller configured to manage the batteries by determining states of charge (SoCs) of the first and second batteries 110 and 115, states of health (SoHs) of the first and second batteries 110 and 115, and the like based on the information on the states of the first and second batteries 110 and 115.

The BMS 160 may monitor the charge states of the first and second batteries 110 and 115 and transmit the state information on the charge states of the first and second batteries 110 and 115 to the power management device 200.

The power management device 200 may be a device configured to manage power of a high voltage.

The BMS 160 may obtain the charge state of the battery corresponding to the current, voltage, and temperature of each battery cell from a pre-stored table. In the pre-stored table, a charged amount of the battery may correspond to and match with the correlation with the currents, voltages, and temperatures of the battery cells.

The plurality of controllers may include a first controller 181 and a second controller 182.

The first controller 181 is a controller of a drive system and is configured to control the operation of the drive motor 120.

The second controller 182 is a controller of a non-drive system and may include a body controller 182a configured to control a door lock device, a wiper, a power seat, a heating wire of a seat, a ventilation device of the seat, an indoor lamp, and a power tailgate, a communication controller 182b configured to control the communicator 90, and a terminal controller 182c configured to control the vehicle terminal 40 to perform at least one of an audio mode, a video mode, a navigation mode, a broadcasting mode (DMB function), and a radio mode.

The first controller 181 and the second controller 182 may perform cooperative control with the power management device.

The power management device 200 includes a distributor 210, a processor 220, and a memory 230.

The distributor 210 includes a plurality of switches 211 to 214.

The plurality of switches may be turned on or off in response to a control command of the processor. Each switch 211, 212, 213, and 214 may be a relay.

As shown in FIG. 6, the plurality of switches may include first and second switches 211 and 212 configured to supply power of the first battery 110 and include a third switch 213 configured to supply power of the first converter 116 and a fourth switch configured to supply power of the second battery 115.

The first switch 211 is connected between the first battery 110 and the drive motor 120 to supply the power of the first battery to the drive motor in response to an ON operation and to cut off the power of the first battery supplied to the drive motor 120 in response to an OFF operation.

The second switch 212 is connected between the first battery 110 and the first load 171 to supply the power of the first battery 110 to the first load 171 to consume high power in response to an ON operation and to cut off the power of the first battery 110 supplied to the first load 171 in response to an OFF operation.

The first load 171 may include an air conditioner, a heater, and a heating wire.

The third switch 213 is connected between the first converter 116 and the second load 172 to supply the converted power of the first battery 110 to the second load 172 configured to consume low power in response to an ON operation and to cut off the converted power of the first battery 110 supplied to the second load 172 in response to an OFF operation.

The second load 172 may be a load configured to consume lower power than the power consumed by the first load 171. For example, the second load 172 may include a vehicle terminal, a lamp, and the like.

The fourth switch 214 is connected between the second battery 115 and the third load 173 to supply the power of the second battery 115 to the third load 173 configured to consume low power in response to an ON operation and to cut off the power of the second battery supplied to the third load 173 in response to an OFF operation.

The third load 173 may include the communicator 90.

As shown in FIG. 6, the vehicle may further include a second converter 117 configured to boost the DC power of the first battery 110 to increase the output and efficiency of the drive motor 120.

The first switch 211 may be provided between the first battery 110 and the second converter 117.

In other words, the second converter 117 converts the DC power charged in the first battery 110 into DC power including a certain magnitude or more.

For example, the second converter 117 may convert a DC voltage of about 72 V output from the first battery 110 into a DC voltage of 300 V. The second converter 117 may be omitted depending on the output of the first battery, the driving power of the drive motor, and the capability of the inverter.

The second converter 117 may include at least one switch element and an inductor.

The inverter 130 converts the DC voltage into an AC voltage in response to the output voltage received from the second converter 117 and applies the converted AC voltage to the drive motor 120.

The inverter 130 transmits the regenerative energy of the drive motor 120 to the first battery 110, when the vehicle is braked, to charge the first battery 110.

The processor 220 is configured to control the OFF operations of the first, second, third and fourth switches when the power mode is the OFF mode and is configured to control the ON operation of the first switch and the OFF operations of the second, third and fourth switches when the power mode is the emergency mode.

When the power mode is the emergency mode, the processor 220 may control the ON operation of the first switch to operate the drive motor.

The processor 220 is configured to control the OFF operation of the first switch and the ON operations of the second, third and fourth switches when the power mode is the standby mode and is configured to control the ON operations of the first, second, third and fourth switches when the power mode is the ready mode.

When the power mode is the standby mode, the processor 220 may control the operation of the drive motor 120 to be stopped and allow the remaining electronic components to operate. The remaining electronic components may include the first, second, and third loads.

When the power mode is the ready mode, the processor 220 may supply power to the drive motor 120 and all electronic components so that the drive motor and all electronic components operate.

The processor 220 may independently control the power supply of the drive system and the non-drive system. Here, the drive system includes the drive motor 120, and the non-drive system includes electronic components excluding the drive motor.

When entering the ready mode, the processor 220 may count a time from a start time of the ready mode and switch the ready mode to the standby mode when the counted time elapses a reference time. The reference time may be about 10 minutes.

When entering the standby mode, the processor 220 may count a time from a start time of the standby mode and switch the standby mode to the OFF mode when the counted time elapses a preset time. The preset time may be about 5 minutes.

When a pedal signal is received from the pedal signal receiver 81 before the preset time elapses in the standby mode, the processor 220 switches the standby mode to the ready mode.

When the start OFF signal is received from the start button 36 before the preset time elapses in the standby mode, the processor 220 switches the standby mode to the OFF mode.

The state of the vehicle in the OFF mode may be the parked state.

The processor 220 may control display of progress information of the standby mode while performing the standby mode and change setting information of the standby mode in response to the user input. This will be described in more detail.

The processor 220 determines whether the vehicle is in the stopped state.

The processor 220 may determine whether the traveling speed is lower than or equal to a reference speed based on the speed information detected by the speed detector and determine that the vehicle is in the stopped state when it is determined that the traveling speed is lower than or equal to the reference speed. For example, the reference speed may be 0 km/h.

When the signal is received from the parking button 38, the processor 220 may determine that the vehicle is in the stopped state.

When the signal received by the lever signal receiver 82 is the signal of the parking stage, the processor 220 may determine that the vehicle is in the stopped state.

When it is determined that the vehicle is in the stopped state, the processor 220 may determine whether the vehicle is in the start ON state and enter the standby mode when it is determined that the vehicle is in the start ON state.

The processor 220 may determine whether the vehicle is in the stopped state and the start OFF state, determine whether the start ON signal has been received when it is determined that the vehicle is in the start OFF state, and enter the standby mode when it is determined that the start ON signal has been received.

The processor 220 may determine whether the power mode is the OFF mode, determine whether the start ON signal is received from the start button 36 when it is determined that the power mode is the OFF mode, and also enter the standby mode when it is determined that the start ON signal has been received.

When entering the standby mode, the processor 220 supplies the power of the first battery 110 to the load 171 by controlling the ON operation of the second switch 212.

When entering the standby mode, the processor 220 determines whether the user has boarded the vehicle based on the detection information of the detector 70.

The processor 220 determines whether the user has boarded or exited the vehicle based on the detection information of the detector 70 provided in the driver's seat 31a. The detection information of the detector provided in the driver's seat 31a may include at least one of pressure information, weight information, and capacitance information.

The processor 220 determines whether the user has boarded or exited the vehicle based on the detection information of the detector provided on the seat belt of the driver's seat 31a. The detection information of the detector provided in the seat belt may be fastening information or unfastening information of the seat belt.

The processor 220 determines whether the user has boarded or exited the vehicle based on the detection information of the detector 70 provided on the door of the driver's seat 31a. The detection information of the detector provided on the door may include the open information and close information of the door.

The processor 220 may determine whether the user has boarded or exited the vehicle based on communication connection information with a pre-registered user's terminal.

The processor 220 may also determine whether the user has boarded or exited the vehicle based on image information of a camera provided in the vehicle.

When the detector is provided on the seat or the seat belt, the processor 220 may determine that the user is in the boarded state based on the detection information of the detector provided on the seat belt or the seat, and at the instant time, ignore the open signal and close signal of the door to determine whether the user has boarded the vehicle.

As described above, the processor 220 may determine states in which the user has boarded and exited the vehicle based on the detection information of the detector 70.

The processor 220 may receive a user presence signal corresponding to the user's boarding and receive a user absence signal corresponding to the user's getting off through the communicator 90. In the instant case, the communicator 90 may be in a state of being connected to the detector 70 by communication.

When entering the standby mode, the processor 220 determines whether the user has boarded the vehicle and supplies the power of the first battery for a preset time based on information on the preset time when it is determined that the user has boarded the vehicle.

The processor 220 is configured to control the ON operation of the second switch for the preset time from the time of entering the standby mode and is configured to control the OFF operation of the second switch when the preset time elapses from the time point of entering the standby mode.

The processor 220 switches to the OFF mode when the user is in the boarded state and the preset time elapses from the time point of entering the standby mode.

When it is determined that the user is getting off in the standby mode state, the processor 220 may confirm the remaining time until the standby mode is switched to the OFF mode and display the confirmed remaining time on the vehicle terminal 40.

The processor 220 may perform cooperative control with the vehicle terminal 40 to display the remaining time.

When the selection signal of the power extension time button b1 is received through the input device 41, the processor 220 is configured to control the display of the screen for extending the power and extends the remaining time until the standby mode is switched to the OFF mode based on the time information received through the input device 41.

The standby mode may include a utility mode in which power is supplied to various electronic components using the first and second batteries of the vehicle in a state in which the vehicle is turned off.

The processor 220 may also control the maintenance of the standby mode when the selection signal of the standby mode maintenance button b2 is received and also immediately switch the standby mode to the OFF mode when the selection signal of the immediate power OFF button b3 is received.

When the selection signal of the call button b4 is received, the processor 220 may confirm pre-stored contact information of the user and transmit the call information to the user based on the confirmed contact information.

When the user exits the vehicle or is in a state of not operating the various electronic components in the vehicle while the standby mode is performed, the processor 220 is configured to control the power supply of the first battery 110 only for the preset time to prevent the charged amount of the first battery 110 from being discharged to a reference charged amount or less.

The processor 220 determines whether an OFF timer release signal has been received while the power of the first battery 110 is supplied, stops counting the off-time when it is determined that the OFF timer release signal is received, and is configured to control the power supply of the first battery 110 to be maintained. This will be described with reference to FIG. 7.

Figure 7:
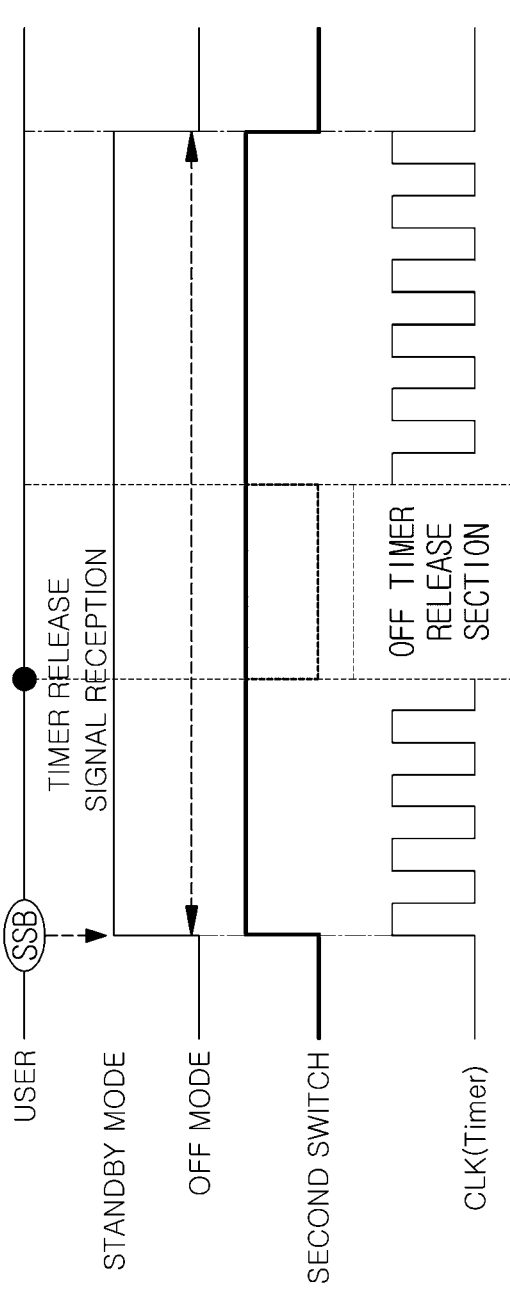
FIG. 7 is an exemplary view showing an OFF timing in a standby mode of a power management device of a vehicle according to an exemplary embodiment of the present disclosure.

As shown in FIG. 7, the processor 220 enters the standby mode based on the start ON signal of the start button, is configured to control the ON operations of the second switch 212, the third switch 213, and the fourth switch 214, and counts the time from the time point of entering the standby mode.

The processor 220 determines whether the counted time has elapsed the preset time and switches the standby mode to the OFF mode when it is determined that the counted time has elapsed the preset time.

The processor 220 determines whether the OFF timer release signal has been received while the time is counted, stops counting the off-time when it is determined that the OFF timer release signal has been received, and is configured to control the power supply of the first battery 110 to be maintained.

The OFF timer release signal may include the pedal signal of the brake pedal through the pedal signal receiver 81, a connection signal of a diagnostic device configured to diagnosing the vehicle or reprogramming various controllers, a connection signal of a charging cable, a selection signal of the utility mode, and a selection signal of the standby mode maintenance button.

The processor 220 may perform cooperative control with at least one of the first and second controllers in the standby mode and may also perform cooperative control with the BMS 160.

For example, when the start ON signal is received, the processor 220 may perform cooperative control with the second controller 182 so that the first, second, and third loads are operated while entering the standby mode and perform cooperative control with the drive controller 181, which is the first controller, so as not to operate the drive motor 120.

The processor 220 may display the progress information of the standby mode through the vehicle terminal 40 through the cooperative control with the terminal controller 182c in the standby mode and change the setting information of the standby mode in response to the user input received through the vehicle terminal 40.

When the pedal signal is received from the pedal signal receiver 81, the processor 220 may determine the reception of the pedal signal as the user's traveling intention to perform the cooperative control with the drive controller 181 to operate the drive motor 120.

When a connection signal of the diagnostic device is received, the processor 220 may control the OFF operation of the second switch 212. The processor 220 may perform cooperative control with the communication controller 182b.

The processor 220 may control the mode switching between the OFF mode and the ready mode, control the mode switching between the ready mode and the standby mode, or control the mode switching between the OFF mode and the standby mode and change the display information of the vehicle terminal in response to the start ON signal and start OFF signal of the start button 36, the pedal signal of the brake pedal 52, the ON signal of the parking button 38, the OFF signal of the parking button, the lever signal of the shift lever 37, the detection information of the detector, and the user input received by the vehicle terminal.

Figure 8:
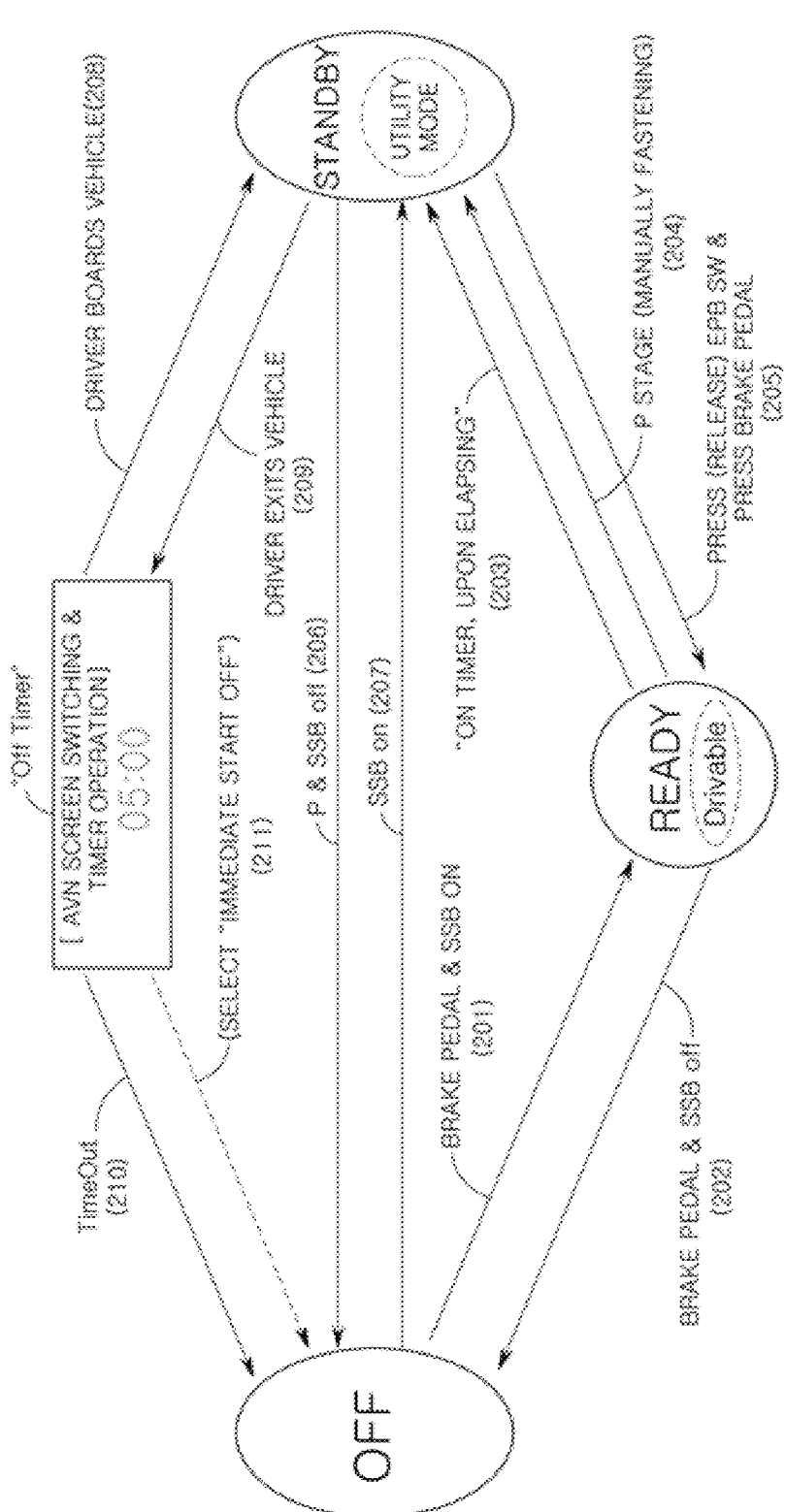
FIG. 8 is an exemplary view showing switching of a power mode of a power management device of a vehicle according to an exemplary embodiment of the present disclosure.

This will be described with reference to FIG. 8.

The mode switching between the OFF mode OFF and the ready mode READY will be described.

When the start ON signal is received from the start button 36 and the pedal signal is received from the pedal signal receiver 81 while performing the OFF mode, the processor 220 switches the OFF mode to the ready mode (201). Here, the pedal signal may include the pedal force signal of the brake pedal.

When the start OFF signal is received from the start button 36 and the pedal signal is received from the pedal signal receiver 81 while performing the ready mode, the processor 220 switches the ready mode to the OFF mode (202).

When the vehicle is in the stopped state while the ready mode is performed, the processor 220 automatically shifts the shift lever to the P stage in the ready mode and switches the ready mode to the OFF mode when only the start OFF signal is received from the start button 36 without signal of the brake pedal (202).

The stopped state may include an auto hold maintenance state at the D or R stage of the shift lever and include a stopped state after a manual shift of the shift lever to the N stage on a flat ground.

The mode switching between the ready mode and the standby mode will be described.

The processor 220 needs to determine that the user's traveling intention is not present to determine whether to switch from the ready mode to the standby mode.

The processor 220 determines whether the received lever signal is the signal of the parking stage when the lever signal is received from the lever signal receiver 82 while performing the ready mode, determines that the user's traveling will is not present when the received lever signal of the shift lever is the signal of the parking (P) stage, and immediately switches the ready mode to the standby mode (204).

When the ON signal is received from the parking button 38 while performing the ready mode, the processor 220 may also switch the ready mode to the standby mode.

The processor 220 needs to determine that there is no traveling intention even in the state in which the position of the shift lever is not positioned at the parking stage (203).

After entering the ready mode, the processor 220 may control the operation of the standby mode ON timer to determine that the user's traveling intention is not present in the state in which the position of the shift lever is not positioned at the parking stage (203).

The processor 220 counts the time of the ON timer from the time point when the vehicle is stopped while the ready mode is performed and switches the ready mode to the standby mode when it is determined that the user's traveling intention is not present within the reference time and the reference time elapses (203). For example, the reference time may be about 10 minutes.

When the operation signals of the shift lever, the brake pedal, and the steering wheel are not received, the processor 220 may determine that the user's traveling intention is not present.

The processor 220 determines whether the traveling speed of the vehicle is lower than a preset traveling speed based on the speed information of the speed detector, determines whether the position of the shift lever is positioned at the parking stage based on the lever signal of the lever signal receiver when it is determined that the traveling speed of the vehicle is lower than the preset traveling speed, and determines that the vehicle is in the stopped state when it is determined that the position of the shift lever is not the parking stage. Here, the preset traveling speed may be about 5 km/h or lower.

The processor 220 counts the time from the time point when it is determined that the vehicle is in the stopped state, automatically changes the position of the shift lever to the parking stage when it is determined that the user's traveling intention is not present within the reference time of the ON timer and the reference time elapses, and switches to the standby mode (203).

The processor 220 may control the position of the shift lever so that the position of the shift lever is changed to the position of the parking stage when switching the ready mode to the standby mode.

The processor 220 may control the operation of the ON timer to be maintained even when the open or close signal of the door and the user input for the first, second, and third loads are received.

When it is determined that the traveling speed of the vehicle is lower than the preset traveling speed and the position of the shift lever is positioned at the reverse stage, the processor may also determine that the user's traveling intention is not present.

When the OFF signal is received from the parking button 38 and the pedal signal is received from the pedal signal receiver 81 while performing the standby mode, the processor 220 switches the standby mode to the ready mode (205).

The OFF signal of the parking button may be a release signal of the electronic parking brake device.

The mode switching between the OFF mode and the standby mode will be described.

When the lever signal is received from the lever signal receiver 82 while performing the standby mode, the processor 220 determines whether the received lever signal is the signal of the parking stage, determines whether the start OFF signal is received from the start button 36 when it is determined that the received lever signal is the signal of the parking stage, and switches the standby mode to the OFF mode when it is determined that the start OFF signal has been received from the start button 36 (206).

When it is determined that the start ON signal has been received from the start button 36 while the OFF mode is performed, the processor 220 switches the OFF mode to the standby mode (207).

The processor 220 may change the display information of the vehicle terminal while performing the mode switching between the standby mode and the OFF mode.

When it is determined that the user is in the boarded state while the standby mode is performed, the processor 220 may control the vehicle terminal 40 to display the progress information of the standby mode and control the standby mode to be maintained (208).

When it is determined that the user has exited the vehicle while the standby mode is performed, the processor 220 may also change a navigation image to the image of the progress information of the standby mode and display the changed image and may also display a plurality of buttons to change the setting information of the standby mode. Therefore, when the user exits the vehicle, the fellow passenger may change the setting information of the standby mode.

When it is determined that the user has exited the vehicle while the standby mode is performed, the processor 220 may change the image of the progress information of the standby mode to the image of the OFF timer and display the changed image and may control the vehicle terminal 40 to display the remaining time information counted by the OFF timer (209).

The OFF timer counts a time which remains until the time point of switching to the OFF mode.

It is possible to save the power by changing cover information displayed on the vehicle terminal 40.

The processor 220 may switch a power saving mode of the vehicle terminal 40 to a normal mode in response to the open signal of the door, the close signal of the door, and the user input of the vehicle terminal 40.

When entering the standby mode, the processor 220 displays the image of the OFF timer, counts the time from the start time point of the standby mode while performing the standby mode, and switches the standby mode to the OFF mode when it is determined that the counted time has elapsed the preset time (210).

When the selection signal of the immediate power OFF button b3 is received while performing the standby mode, the processor 220 switches the standby mode to the OFF mode (211).

The processor 220 may change the power extension time in response to the selection signal of the power extension time button b1 while performing the standby mode and also display the information on the charge state of the first battery.

The processor 220 may also stop the operation of the OFF timer when it is determined that the user who has exited while performing the standby mode has boarded again.

The processor 220 may also be a processor provided in the power management device and a processor provided in the vehicle.

The processor 220 may be implemented as a memory configured to store data on an algorithm for controlling the operations of the components in the vehicle 1 or a program for reproducing the algorithm and a processor configured to perform the above-described operation using the data stored in the memory. In the instant case, the memory and the processor may be implemented as separate chips, respectively. Alternatively, the memory and the processor may also be implemented as a single chip.

The memory 230 stores the user's contact information.

The contact information may include a phone number of the user terminal, a phone number of the user's home, and an email address of the user.

The memory 230 may store information on the reference time corresponding to the ON timer and the preset time for the OFF timer.

The memory 230 may store information on the power extension time selected by the user.

The memory 230 may be implemented as at least one of non-volatile memory devices, such as a cache, a read only memory (ROM), a programmable ROM (PROM), an erasable programmable ROM (EPROM), an electrically erasable programmable ROM (EEPROM), and a flash memory, volatile memory devices, such as a random access memory (RAM), and storage media, such as a Hard Disk Drive (HDD) and a CD-ROM, but the present disclosure is not limited thereto.

Meanwhile, each component shown in FIGS. 3 and 6 refers to software and/or hardware components, such as a field programmable gate array (FPGA) and an application specific integrated circuit (ASIC).

At least one component may be added or deleted in response to the performance of the components of the power controller shown in FIGS. 3 and 6. Furthermore, it will be readily understood by those skilled in the art that the mutual positions of the components may be changed in response to the performance or structure of the system.

Meanwhile, the disclosed exemplary embodiments of the present disclosure may be implemented in the form of a recording medium configured to store instructions executable by a computer. The instructions may be stored in the form of program code and may perform the operations of the disclosed exemplary embodiments disclosed by generating the program module when executed by a processor. The recording medium may be implemented as a computer-readable recording medium.

Computer-readable recording media include all types of recording media in which the instructions readable by the computer are stored. For example, there may be a ROM, a RAM, a magnetic tape, a magnetic disc, a flash memory, an optical data storage device, and the like.

According to one aspect, it is possible to supply power of a first battery to various electronic components by performing a standby mode in a stopped state. Therefore, a user can conveniently stay using a vehicle.

According to an exemplary embodiment of the present disclosure, it is possible to extend a seamless use time of an electronic component (e.g., an air conditioner) before and after traveling because the power of the first battery may be used in the standby mode.

According to an exemplary embodiment of the present disclosure, by use of a standby mode as a utility mode, it is possible to easily enter the utility mode.

According to an exemplary embodiment of the present disclosure, it is possible to decrease the number of relays for an accessory power source (ACC) and an ignition power source (IG), contributing to the cost saving (a decrease in the number of wires and a decrease in the number of relay components).

According to an exemplary embodiment of the present disclosure, it is possible to independently perform the power supply of drive systems and the power supply of non-drive systems. Therefore, it is possible to improve the stability of the autonomous traveling in a vehicle configured for autonomous traveling.

According to an exemplary embodiment of the present disclosure, it is possible for a user to select a time for which the standby mode is automatically changed into an OFF mode. In other words, according to an exemplary embodiment of the present disclosure, it is possible to select a power selection time of the first battery after a driver exits. At the instant time, it is possible for the user to recognize a state of the first battery by informing the user of information on the discharge possibility of the first battery and a decrease in a traveling range.

According to an exemplary embodiment of the present disclosure, it is possible to prevent a fellow passenger from being in danger by transmitting a notification message to the driver who exited in the event of an emergency for the fellow passenger staying in the vehicle.

According to an exemplary embodiment of the present disclosure, it is possible to improve the merchantability of the vehicle, furthermore, increase the user's satisfaction, improve the user's reliability, and secure the competitiveness of a product.

In various exemplary embodiments of the present disclosure, each operation described above may be performed by a control device, and the control device may be configured by multiple control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A power management apparatus comprising:
an input device;
a first battery;
a converter connected to the first battery and configured to convert power charged in the first battery into power including a different magnitude;
a second battery connected to the converter and configured to perform charging thereof using the power transmitted from the converter;
a distributor configured to distribute power of the first and second batteries and the converter; and
a processor connected to the input device and the distributor and configured to perform control to be switched to an OFF mode when a preset time elapses from a start time point of a standby mode, and to perform control so that a time in the standby mode is extended when power extension time information is received through the input device before switching to the OFF mode, wherein the distributor includes:
a first switch connected between the first battery and a drive motor;
a second switch connected between the first battery and a first load;
a third switch connected between the converter and a second load; and
a fourth switch connected between the second battery and a third load.

2. The power management apparatus of claim 1, further including:
a display and a communicator operatively connected to the processor,
wherein the processor is configured to control the display to display an image of an OFF timer and an image of a button for changing setting information of the standby mode when the processor receives a user's absence signal through the communicator.

3. The power management apparatus of claim 2, wherein the image of the button includes an image of a power extension time button, an image of a standby mode maintenance button, and an image of an immediate power OFF button.

4. The power management apparatus of claim 1, wherein the processor is configured to:
control an OFF operation of the first switch and control ON operations of the second, third and fourth switches in the standby mode; and
control OFF operations of the first, second, third and fourth switches in the OFF mode.

5. The power management apparatus of claim 1, further including:
a communicator,
wherein the processor is configured to:
switch the OFF mode to a ready mode when a start ON signal and a pedal signal of a brake pedal are received through the communicator while performing the OFF mode; and
switch the ready mode to the OFF mode when a start OFF signal and the pedal signal of the brake pedal are received through the communicator while performing the ready mode.

6. The power management apparatus of claim 1, further including:
a communicator,
wherein the processor is configured to:
switch the OFF mode to the standby mode when the processor receives a parking stage signal of a shift lever and a start ON signal through the communicator while performing the OFF mode; and
switch the standby mode to the OFF mode when the processor receives a start OFF signal through the communicator while performing the standby mode.

7. The power management apparatus of claim 1, further including:
a communicator,
wherein the processor is configured to:
switch the standby mode to a ready mode when the processor receives a release signal of a parking button and a pedal input signal of a brake pedal for shift through the communicator while performing the standby mode; and
switch the ready mode to the standby mode when the processor receives a parking stage signal of a shift lever through the communicator while performing the ready mode.

8. The power management apparatus of claim 7, wherein the processor is configured to:

control an operation of an ON timer when the parking stage signal of the shift lever is not received by the processor through the communicator while performing the ready mode; and switch the ready mode to the standby mode after a reference time elapses when the processor concludes that there is no traveling intention while the ON timer operates.

9. A vehicle comprising:

an input device;

a display;

a first battery;

a drive motor connected to a wheel of the vehicle and driven using power of the first battery;

a converter connected to the first battery and configured to convert the power charged in the first battery into power including a magnitude different from a magnitude of the power of the first battery;

a second battery connected to the converter and configured to perform charging thereof using the power transmitted from the converter;

a distributor configured to distribute power of the first and second batteries and the converter; and a processor connected to the distributor and configured to control the distributor to cut off the power supplied to the drive motor in a standby mode, and control the standby mode to be switched to an OFF mode when a preset time elapses from a start time point of the standby mode, wherein the processor is configured to extend a time for which the standby mode is performed or to control the power to be immediately turned off when power extension time information or an immediate off request signal is received by the processor through the input device before switching to the OFF mode while the standby mode is performed, and wherein the distributor includes a first switch connected between the first battery and the drive motor, a second switch connected between the first battery and a first load, a third switch connected between the converter and a second load, and a fourth switch connected between the second battery and a third load.

10. The vehicle of claim 9, further including a detector configured to detect states in which a user boards and exits the vehicle, wherein the processor is configured to determine whether the user has exited the vehicle based on detection information of the detector and is configured to control the display operatively connected to the processor to change an image displayed on the display to an image indicating that the standby mode is active and to display the changed image when the processor concludes that the user has exited the vehicle, and wherein the image indicating that the standby mode is active includes an image of an OFF timer which counts a remaining time until a time point when the standby mode is switched to the OFF mode and an image of a button for changing setting information of the standby mode.

11. The vehicle of claim 10, wherein the processor is configured to determine whether the user has boarded the vehicle based on the detection information of the detector, and is configured to control the standby mode to be maintained when the processor concludes that the user has boarded the vehicle.

12. The vehicle of claim 9, wherein the processor is configured to control an OFF operation of the first switch and ON operations of the second, third and fourth switches in the standby mode, and is configured to control OFF operations of the first, second, third and fourth switches in the OFF mode.

13. The vehicle of claim 9, further including:

a start button; and a pedal signal receiver configured to receive a pedal signal of a brake pedal of the vehicle, wherein the processor is configured to:

switch the OFF mode to a ready mode when the processor receives a start ON signal through the start button and the pedal signal through the pedal signal receiver while performing the OFF mode; and switch the ready mode to the OFF mode when the processor receives a start OFF signal through the start button and the pedal signal through the pedal signal receiver while performing the ready mode.

14. The vehicle of claim 9, further including:

a start button; and a lever signal receiver configured to receive a signal of a shift lever of the vehicle, wherein the processor is configured to:

switch the OFF mode to the standby mode when the processor receives a parking stage signal of the shift lever through the lever signal receiver and a start ON signal of the start button while performing the OFF mode; and switch the standby mode to the OFF mode when the processor receives a start OFF signal of the start button while performing the standby mode.

15. The vehicle of claim 9, further including:

a parking button;

a pedal signal receiver configured to receive a pedal signal of a brake pedal of the vehicle; and a lever signal receiver configured to receive a signal of a shift lever of the vehicle, wherein the processor is configured to:

switch the standby mode to a ready mode when the processor receives a release signal of the parking button and the pedal signal while performing the standby mode; and switch the ready mode to the standby mode when the processor receives a parking stage signal of the shift lever through the lever signal receiver while performing the ready mode.

16. The vehicle of claim 15, wherein the processor is configured to:

control an operation of an ON timer when entering the ready mode; and switch the ready mode to the standby mode when a time counted by the ON timer elapses a reference time.

17. The vehicle of claim 9, further including:

a pedal signal receiver configured to receive a pedal signal of a brake pedal of the vehicle, wherein the processor is configured to stop a remaining time count until a switching time point to the OFF mode when the processor receives the pedal signal before switching the standby mode to the OFF mode while performing the standby mode.

18. The vehicle of claim 9, further including:

a detector configured to detect states in which a user boards and exits the vehicle, wherein the processor is configured to determine whether the user has exited the vehicle based on detection information of the detector and to change the display to a power saving mode when the processor concludes that the user has exited the vehicle.

19. The vehicle of claim 18, wherein the processor is configured to:

control the display to display an image of a call button when the processor concludes that the user has exited the vehicle; and transmit call information to a pre-registered contact when the processor concludes that the call button is selected through the input device.

\*　\*　\*　\*　\*